United States Patent [19]

St. Arnaud et al.

[11] Patent Number: 4,586,081

[45] Date of Patent: Apr. 29, 1986

[54] METHOD AND APPARATUS FOR SECURE AUDIO CHANNEL TRANSMISSION IN A CATV SYSTEM

[75] Inventors: William J. St. Arnaud; Israel Switzer, both of Toronto, Canada

[73] Assignee: Lincoln Center for the Performing Arts, Inc., New York, N.Y.

[21] Appl. No.: 144,362

[22] Filed: Apr. 28, 1980

[51] Int. Cl.[4] ........................ H04N 7/167; H04N 7/04

[52] U.S. Cl. ..................................... 358/121; 358/144

[58] Field of Search ................................ 358/121, 144

[56] References Cited

U.S. PATENT DOCUMENTS 3,936,594 2/1976 Schubin et al. ...................... 358/144

4,245,245 1/1981 Matsumoto et al. ................ 358/121

*Primary Examiner*—S. C. Buczinski

*Attorney, Agent, or Firm*—Davis Hoxie Faithfull & Hapgood

[57] ABSTRACT

A secure audio channel transmission system method and apparatus in which an FM signal is generated on an FM broadcast frequency, such as 107.5 megahertz, divided in frequency by 2 and distributed via a cable television system to subscribers equipped with frequency doubler circuits that reconstitute the FM signal for reception on a standard FM broadcast receiver. Unauthorized reception is prevented by the use of the non-standard, frequency-divided signal which is not receivable by standard broadcast channel television or FM receivers.

13 Claims, 6 Drawing Figures

METHOD AND APPARATUS FOR SECURE AUDIO CHANNEL TRANSMISSION IN A CATV SYSTEM

This invention relates to audio program material transmission on CATV systems. The invention is particularly useful in providing high fidelity audio programs transmitted as the audio component of a television signal in which security is required for the audio portion of the transmission.

The widespread development of cable and community antenna television systems (collectively referred to here as CATV systems) has opened up numerous possibilities for the use of selective program channels, both audio and video, for transmission to designated subscribers. These selective programming channels are available to designated subscribers through special transmission techniques and apparatus provided by the CATV system, and usually do not interfere with the normal program material carried on CATV system. Such selective program channels include pay-television, where a subscriber pays a monthly or per show fee to view premium programs not normally carried by broadcast stations. Pay-television has spurred the growth and development of CATV systems even in geographic areas where there is excellent TV reception.

With the development of pay-television, many institutions and associations have been provided with means for distributing specialized programming on a subscription basis. Cultural institutions such as opera houses, orchestras, dance companies and the like are able to broaden their subscriber base through pay-television and provide live concerts to their own pay-television subscribers. In such cases, the audio portion of the signal usually is very important to the subscribers. Unfortunately, however, when operas, concerts and the like are transmitted on CATV systems as conventional television transmissions, the audio quality is often far from ideal. Those who pay for such programming are likely to expect and desire the high fidelity audio that is possible on conventional FM radio broadcasts.

The audio portion of a conventional television broadcast transmission, in accordance with present U.S. standards, is monophonic and has a smaller frequency deviation than a conventional FM broadcast transmission. The audio portion of the signal is therefore noisier than an FM broadcast transmission. Moreover, the audio quality of a television broadcast signal is usually further degraded by the poor quality of the audio receiver section of most television receivers. Accordingly, the present invention will provide subscribers with a system to transmit and recover a high fidelity audio signal which can be stereophonic.

In pay-television programming, it may also be desirable to secure the audio signal to prevent the unauthorized reception of free "radio" broadcasts, even if the video portion is secured. It is further desirable to have an unsecured audio signal to act as a "barker" to advertise the programs. Such features are also available in accordance with the present invention.

Techniques have been developed to provide a stereo signal in normal television broadcast transmission. Unfortunately, such techniques require modification to conventional receivers and are generally quite complex in nature. Moreover, since the frequency deviation of the television audio carrier is limited to 25 kHz, providing two channels would necessarily further reduce the audio quality.

Most potential subscribers to high fidelity programming already have high quality FM receivers. Such receivers are made to receive standard FM broadcasts and usually reproduce audio signals with high fidelity. Accordingly, it would be advantageous for the subscriber to a subscription CATV service to receive a standard stereophonic FM signal. Use of an FM signal in the FM broadcast band would also minimize the cost and complexity of the subscriber's apparatus for receiving the subscription channel.

CATV systems often also carry FM signals, usually as retransmissions of local commercial radio stations; however, the commercially broadcast FM material often leaves much to be desired. Only certain types of music may be available and the broadcasts are usually frequently interrupted by commercial messages. Moreover, as commercial FM broadcast stations become more successful, they carry less programs of a specialized nature that would appeal to small but select audiences. Accordingly it would be advantageous to provide a subscription audio service in which one or more audio program signals could be transmitted over CATV systems to designated subscribers.

It is important in a subscription radio or television service that the signal be available only to designated subscribers. Furthermore, it is as important that the subscription channel not interfere with the reception of the regular CATV signals. Either equipment to prevent reception of a subscription program channel is provided to those customers who do not wish to subscribe, or equipment to allow reception of a subscription program channel is provided to those who do wish to subscribe. In a subscription radio or television service, the number of subscribers may be small in proportion to the number of CATV users. Accordingly it would be advantageous to provide a secure FM transmission service with a security apparatus that is used only by those CATV users wishing to subscribe. As a result, the transmitted signal must not be receivable by standard broadcast channel television or FM receivers, nor should it interfere with the regular CATV service.

The present invention provides an FM transmission scheme of relatively simple construction and low cost using an FM signal on a broadcast frequency, for example 107.5 megahertz. Prior to distribution, the signal frequency is divided by 2 to 53.75 megahertz, a frequency outside the standard broadcast channel FM and TV frequencies, thereby preventing reception by standard FM or TV receivers. Alternatively, the signal is directly generated at a frequency outside standard broadcast channels, for example at 53.75 MHz. The frequency 53.75 megahertz is particularly useful because it falls into the lower adjacent sound trap for television Channel 2 in the United States. As a result, the signal can be transmitted with minimum interference to or from other signals on the CATV system. At each subscriber's station, the signal is altered so that it may be received by conventional FM broadcast receiving equipment, for example, by using special frequency doubling circuitry. In one arrangement, audio signals from a known source are stereo multiplexed by known means into a composite signal and then modulated on FM carrier frequency (for example, 107.5 megahertz) by known means. In accordance with our invention, the FM carrier frequency signal is then applied to a high speed divide-by-two circuit consisting of a high speed flip-flop configured to produce the original signal divided by 2 in frequency. The resultant signal is then applied to a bandpass filter which eliminates all spurious products of the divided FM signal.

The divided FM signal is then adjusted in level, combined by known means with other signals common to the CATV system and transmitted over cable to the subscriber's location or station. At each subscriber's location the signal is split from the CATV trunk cable by known means and may again be split within the subscriber's location to feed the subscriber's other receivers. At the receiver, the regular FM broadcast channel signals can be recreated by the decoding circuitry for normal reception by the subscriber's receiver.

It is important that the part of the secure FM transmission system located within the headend be relatively compact and maintenance free. It is also desirable that the equipment be relatively low cost so that the secure FM transmission system can be added to the cable system without a great deal of expense either to the operator of the cable system or to the individual subscriber. Many CATV systems have multiple remote headends and each would require a divider. Since the individual subscriber stations may number in the thousands it is particularly important that the portion of the secure FM transmission system to be located within each subscriber station be inexpensive as well as compact in size and relatively maintenance free. As will become more apparent from the discussion to follow, circuitry of compact size and low cost is achieved in accordance with the invention by use of circuit designs which are easily fabricated in integrated form and which greatly minimize the use of relatively large components such as variable inductors and capacitors.

Other and further advantages, objects and features of the invention will become apparent to those skilled in the art from a reading of the following detailed description of a preferred embodiment of the invention when taken in light of the accompanying drawings in which.

Figure 1:
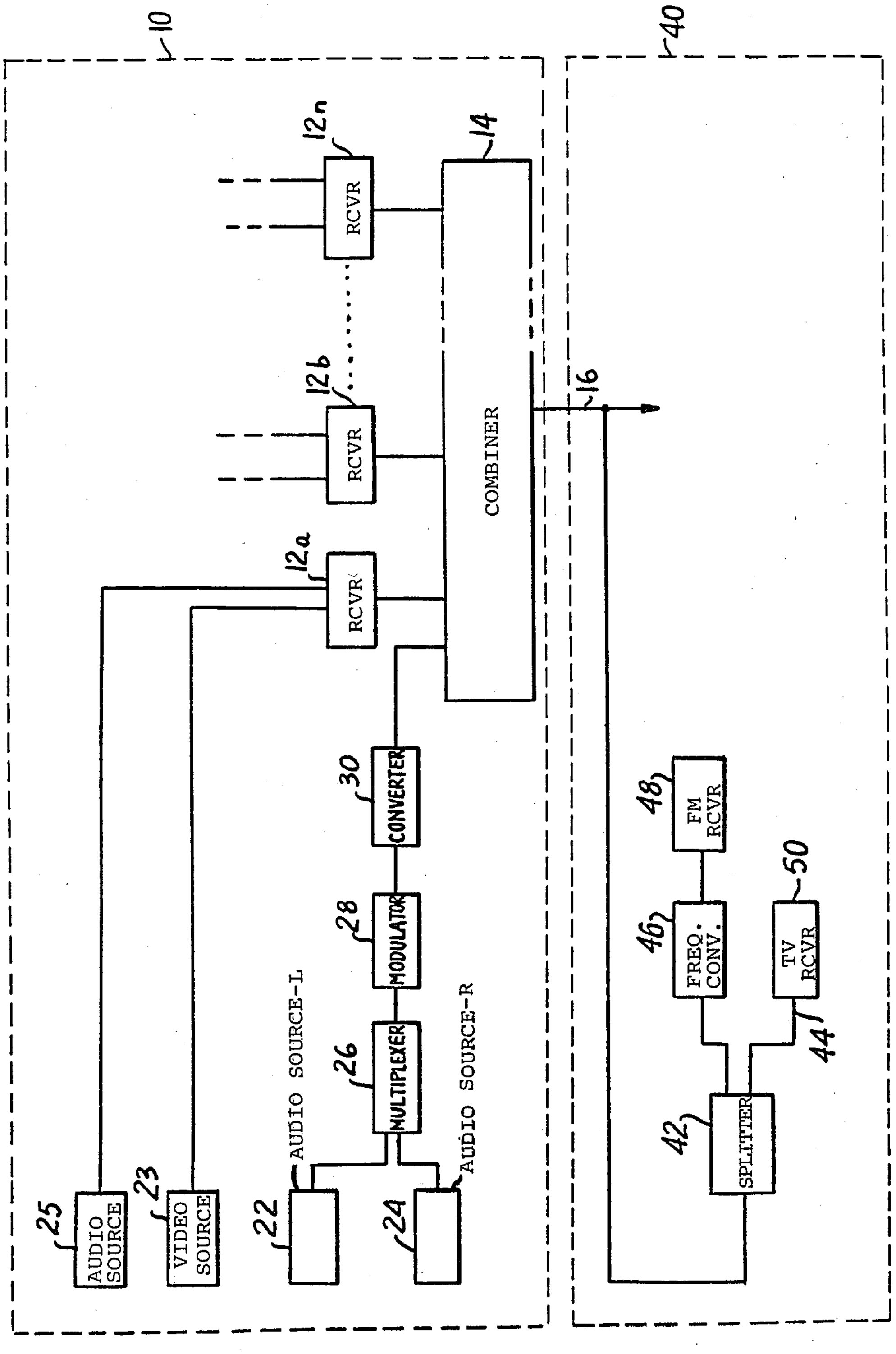
FIG. 1 is a schematic representation, in block form, of an embodiment of the transmission system in accordance with the invention.

The system of FIG. 1 shows a CATV station or headend 10 including conventional receiving and processing equipment 12*a–n* and combiner 14 for transmission over cable 16 to various subscriber station locations 40 of television signals, radio signals and the like from the receiving and processing equipment 12*a–n*.

The transmitting portion of the secure FM transmission system contained within the headend 10 includes appropriate sources 22 and 24 of a known type for the audio signal. Typical audio sources include playback audio tape machines, and demodulated signals from geostationary satellite, terrestrial microwave and the like. In this embodiment, the sources 22 and 24 represent left and right stereo channel sources. The stereo multiplexer 26 multiplexes the two audio input signals. It also provides, by known means, a 19 kHz stereo pilot and produces the conventional composite signal including the stereo pilot and the stereo audio signal, multiplexed, suitably filtered and amplified for modulation into an FM signal. The FM modulator 28 generates a corresponding audio modulated signal by known means having a carrier frequency of, for example, 107.5 megahertz. This particular frequency for the output of the FM modulator was chosen because when the frequency of the FM signal is divided by 2 by the frequency converter 30, the resultant carrier at 53.75 megahertz causes minimal interference with other transmissions on the CATV system. The frequency 53.75 megahertz lies below the channel 2 band in the lower adjacent sound position which is normally trapped out by filter in a television set. This frequency is also sufficiently high to be within the band-pass of conventional CATV systems. Alternatively, the FM signal can be directly generated at the lower frequency. In those CATV systems in which harmonically related carriers are used, the lower corresponding adjacent sound position can be used, but it will be lower in frequency, 52.5 megahertz for channel 2.

Since it is possible that communications receivers may be tuned to this frequency or that "sound-only" radios for the television band may be tuned downwards to this frequency, an additional means of security may be necessary. Alternate switching in the converter 30 between the divided and the undivided signal at the transmitting end, and then combining the restored and bypassed signals in the converter 46 at the subscriber station through suitable delay can be used to provide this additional security.

The secure audio modulated signal produced within the headend 10 is adjusted in amplitude and combined by known means in a combiner 14 with signals from the equipment 12*a–n* for the CATV system's other services. Among these signals is a video modulated signal, associated with the audio signals from sources 22 and 24, from a video source 23. This video modulated signal is generated by a video transmitter 12*a*. An audio signal from a separate source 25 can also be provided to modulate a subcarrier generated by the video transmitter 12*a* in conventional television broadcast fashion. The resultant combination of signals is the over the cable system 16 to the subscriber's equipment 40.

At the subscriber's equipment 40, the cable feed is split by known means through a splitter 42 with the cable signals going to the subscriber's television set 50 or a conventional CATV converter, and to the subscriber's frequency converter circuit 46. The splitter 42 may also have outputs to provide signals to the user's other equipment. The frequency converter circuit 46 extracts the 53.75 megahertz signal and doubles it to 107.5 megahertz. Accordingly the receiver 48, which is tuned to that channel in the FM broadcast band, is capable of receiving the audio modulated signal and can reproduce the audio carried thereby without modification. The conventional TV sound channel can be employed for promotional purposes.

Figure 2:
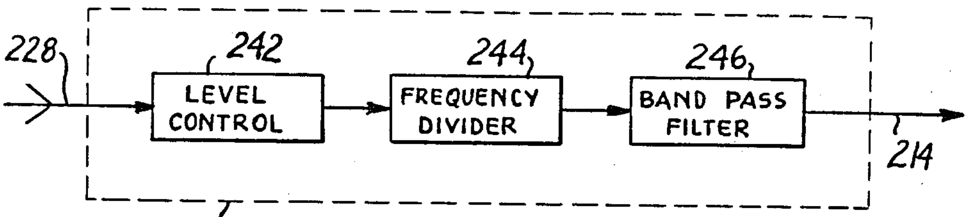
FIG. 2 is a schematic representation, in block form, of one arrangement of the headend frequency converter for the embodiment of FIG. 1.

One embodiment of the headend frequency converter circuit 30 of FIG. 1 is converter 230 shown in block diagram form in FIG. 2. The output from the FM modulator 28 at 107.5 megahertz is received on wire 228 and fed to a level control 242 which is adjusted to provide the appropriate amplitude for the frequency divider 244. The level control 242 can be either passive or include an amplifier as is appropriate for the specific embodiment of the related circuits. The divider 244 divides the frequency by two using a high speed flip-flop. The resulting signal is passed through the bandpass filter 246, which removes all extraneous components resulting from the dividing process. The output signal then goes on wire 214 to the cable system combiner 14 for transmission.

Figure 3:
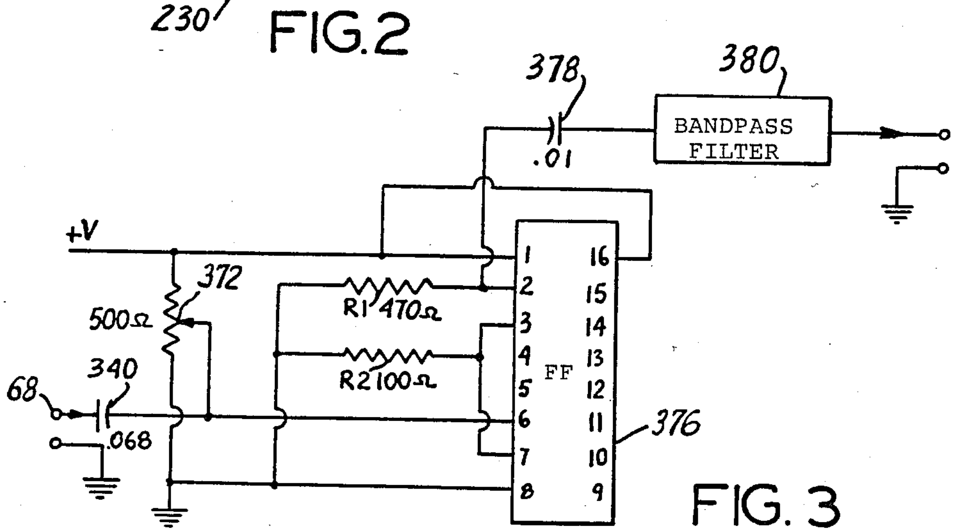
FIG. 3 is a schematic diagram of a divider circuit for producing the frequency divided by two in the embodiment of FIG. 2.

FIG. 3 illustrates a detailed circuit of one embodiment of a headend frequency converter 330. The FM signal at 107.5 megahertz is applied to the input terminal 68 and decoupled by a capacitor 340. The proper bias level is set by adjustment of the potentiometer 372. For an input between 0.3 Volts peak-to-peak and 3.0 Volts peak-to-peak, the bias potentiometer is adjusted to produce a proper output voltage of 2.5 Volts peak-to-peak. The signal is then fed into the clock input, pin 6, of a high speed integrated circuit flip-flop 376, a Motorola Ltd. (Canada) type MC1053. The output on pin 2 of the flip-flop circuit 376 is the divide by two signal. Because the integrated circuit flip-flop operates in a current mode, shunting resistors R1 and R2 are connected to ground in order to produce a voltage varying signal. The voltage signal is then decoupled by a capacitor 378 and fed into a bandpass filter 380. The filter 380, of known construction, has a center frequency of 53.75 megahertz and attenuates all signals above its passband by 60 db.

Figure 4:
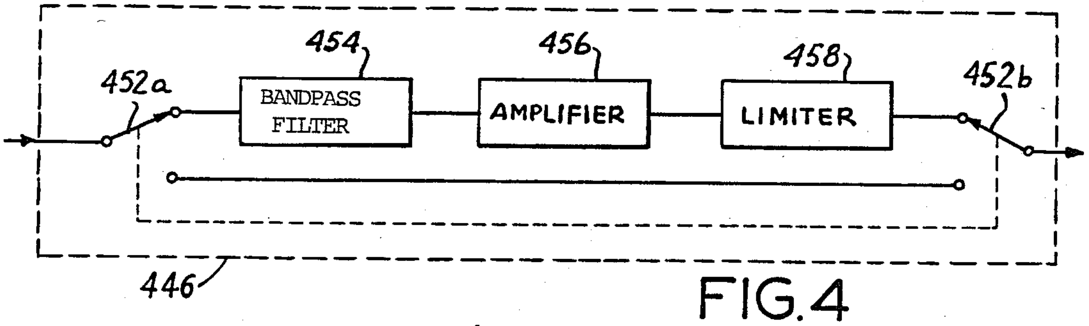
FIG. 4 is a schematic representation, in block form, of one arrangement for the subscriber equipment in the embodiment of FIG. 1 circuit.

FIG. 4 is a block schematic diagram of frequency doubler 446, which is one embodiment of the subscriber frequency converter 46. The signal arrives at switch 452*a* from the cable splitter 42 and is then switched through the doubling circuit or it is bypassed directly to the output through the ganged, user operated switches 452*a* and 452*b*. In the frequency doubling position the signal is applied to bandpass filter 454 which extracts the audio modulated signal of 53.75 megahertz. This signal is then amplified by a radio frequency operational amplifier 456 and then applied to a limiter 458. The limiter 458 clips the 53.75 megahertz signal and produces harmonics of 53.75 megahertz—the most significant harmonic being the one at 107.5 megahertz. The other harmonics fall at 161.25 megahertz and higher, and thus will not interfere with reception of secure FM transmission at 107.5 megahertz on a conventional FM broadcast receiver.

Figure 5:
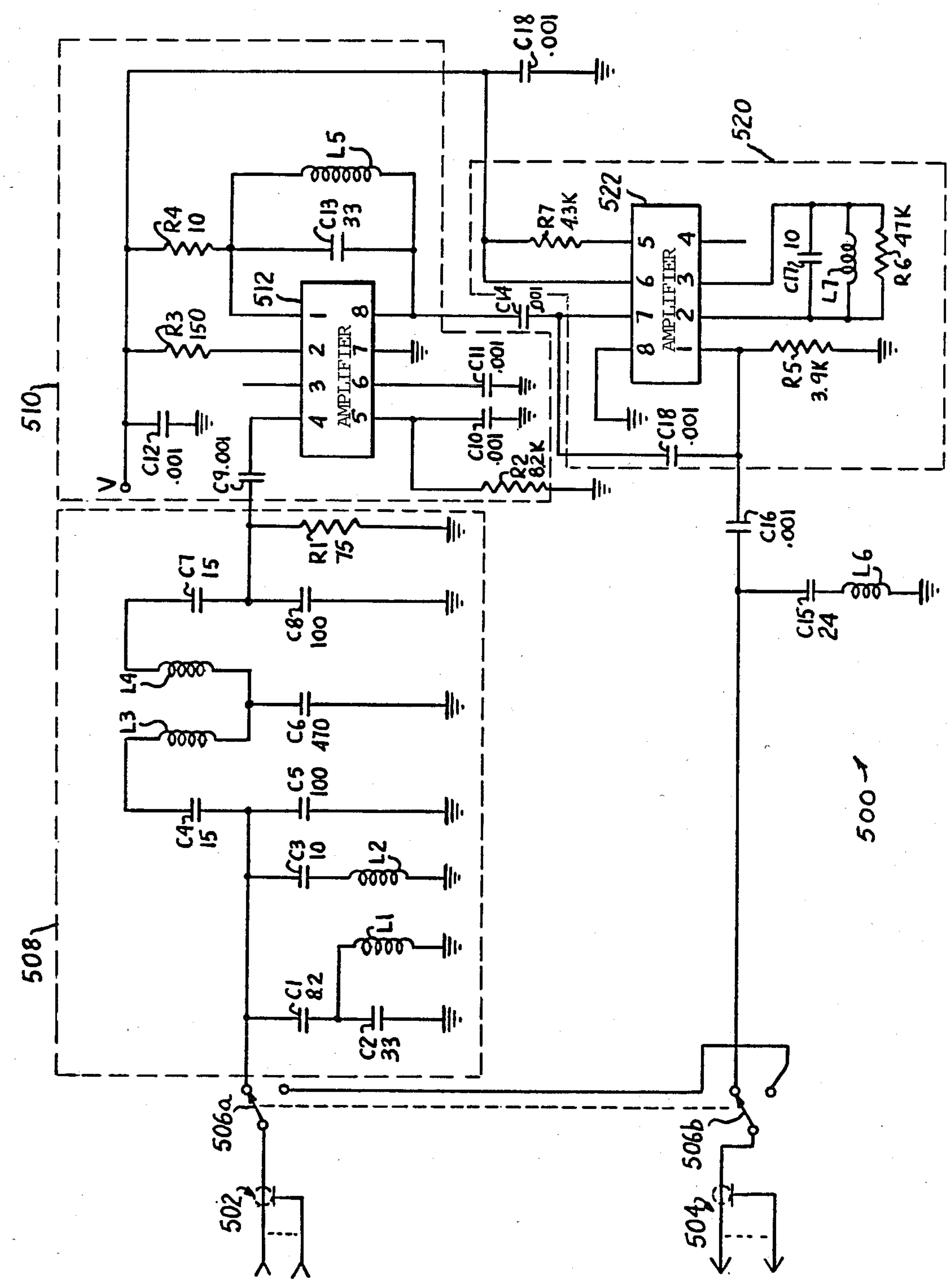
FIG. 5 is a schematic diagram of a frequency converter circuit for the embodiment of FIG. 4.

A detailed circuit diagram of one embodiment of the subscriber's frequency converter, a frequency doubler 500, is illustrated in FIG. 5. The signal from the cable splitter at the input 502 of the subscriber's frequency doubler 500 is either connected by switch 506*a–b* to the frequency doubler 500 or is bypassed directly to the output 504. Both input and output connectors 502,504 are F type connectors suitable for connection to cable systems. The ganged routing switch 506*a–b* is shown in the position to route the signal through the doubling circuit multipole filter 508, which has an attenuation of 60 db outside the passband so that, at most, a minimal signal from the channel 2 television transmissions enters the doubling circuitry.

The signal from the filter 508 is then amplified by a radio frequency amplifier circuit 510 including an operational amplifier 512 (for example, a Motorola Ltd. (Canada) type 1330 AIP integrated circuit). Capacitor C9 decouples the input signal from the input filter. The input to the amplifier 512 is terminal 4 and the outputs are terminal 1 and terminal 8. Capacitor C13 and inductor L5 make the amplifier a high gain, narrow band amplifier with maximum gain at 53.75 megahertz. Resistors R3, R4, R2, and capacitor C10, C11 establish the proper bias and offset as required by the manufacturer's specifications particular for the amplifier 512 employed in this embodiment. Capacitor C14 decouples the signal to the input of the limiting amplifier 522.

The limiter 520 includes a limiter amplifier 522 which is an integrated circuit of known construction (for example Motorola Ltd. (Canada) type 1349B). The input to the limiter amplifier 522 is terminal 7 and the output is terminal 1. The limiting action of the amplifier 522 results in harmonic products of the input frequency. These harmonic products for 53.75 megahertz occur at 53.75 megahertz, 107.5 megahertz, 161.25 megahertz, etc. As a result of the selective frequency amplification at 107.5 megahertz, due to the filter formed by C17, L7, and R6, a usable level of signal at 107.5 megahertz is generated. This signal is passed through the decoupling capacitor C16 to the output 504.

Figure 6:
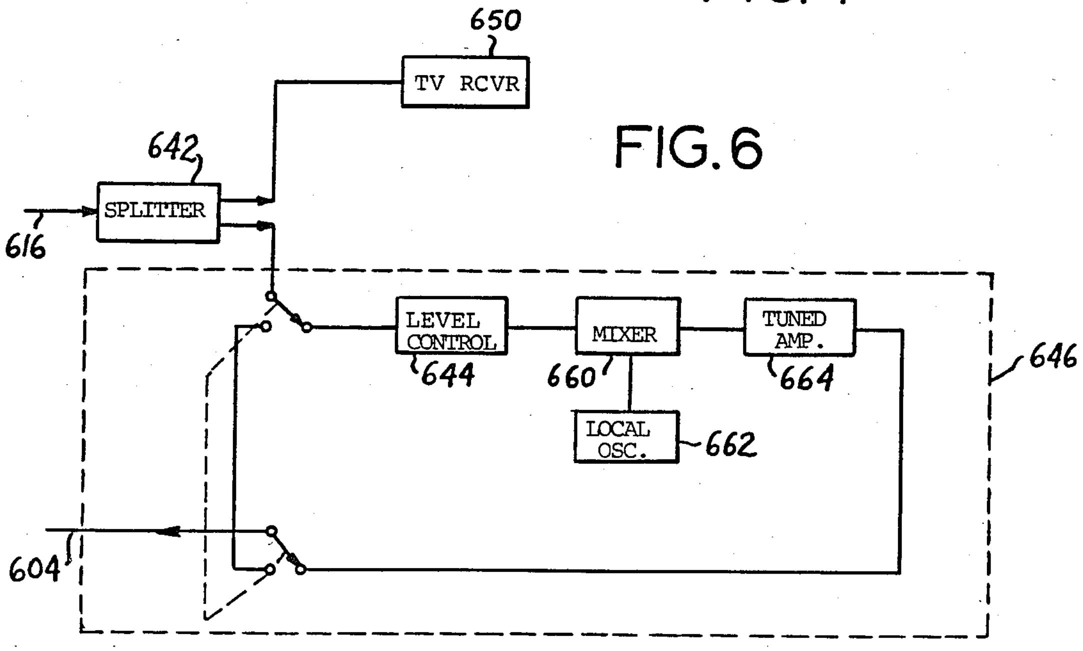
FIG. 6 is a schematic representation, in block form, of a second embodiment of the subscriber equipment in accordance with our invention.

FIG. 6 illustrates another embodiment of the subscriber equipment of our invention. In this embodiment, like the embodiment of FIGS. 1, 4 and 5, the signal from the cable feed 616 is split by a splitter 642, with the cable signals going to the subscriber's television set 650 or a conventional CATV converter, and to the subscriber's frequency converter 646. The frequency converter 646 extracts the audio modulated signal and converts it to a frequency within the FM broadcast band. In the frequency converter 646 of this embodiment, a level control 644 is employed to provide a signal of appropriate amplitude to the mixer 660. A local oscillator 662 provides a stable signal to the mixer 660 for hetrodyning with the audio modulated signal for the level control 644, and producing an output, audio modulated signal in the FM broadcast band. For example, if the carrier frequency of the audio modulated signal is 53.75 megahertz, a local oscillator frequency of 53.75 megahertz will provide an output signal at 107.5 megahertz. It may, however, be desirable to transmit the audio modulated signal at a particular frequency, for example, 53.75 megahertz; but receive the converted signal at a frequency other than a multiple of the transmitted frequency. In such cases, it is only necessary to make the appropriate choice of local oscillator frequency.

The output of the mixer 660 is then fed to a tuned amplifier 664, which in turn is connected to the converter output 604. In an embodiment such as this, headend frequency converter 30 should be designed to avoid presenting a signal having non-standard frequency deviation to subscriber FM radio receiver 48, for example, by using a hetrodyne unit in the head end frequency converter 30. When hetrodyning is employed, the transmission frequency need not be a submultiple of a frequency in a broadcast band.

Only authorized subscribers equipped with the special frequency conversion circuitry in accordance with our invention can receive the special audio programs and special TV audio transmitted over the CATV system. The conventional audio channel of a television signal, such as the signal from source 25, can be employed as a "barker" channel. The secure system is provided at relatively low cost and provides greater fidelity in broadcasting of audio signals. The embodiments described above are examples of a secure FM transmission and reception system. This system should not be taken to limit in any way the scope of our invention. Many modifications, variations, additions and deletions can be made without departing from the spirit and scope of the invention, which is limited only by the claims.

We claim:

1. A method for the secure transmission of audio information in a system for the transmission of associated television audio and video information comprising the steps of picking up the associated audio and video information, transmitting the video information as a conventional television signal in a conventional television channel, wherein the audio information is secured by transmitting the audio information as an FM signal at a radio frequency which is a subharmonic of a frequency in the conventional FM broadcast band and is outside said band, and receiving the FM signal at a frequency converter and converting the FM signal's frequency to a frequency in the conventional FM radio broadcast band for reception by a conventional FM broadcast band radio receiver.

2. The method of claim 1 wherein the audio information is transmitted as an FM signal at approximately 53.75 megahertz.

3. The method of claim 1 wherein video information is transmitted on a CATV system using harmonically related carriers and the audio information is transmitted as an FM signal at approximately 52.5 megahertz.

4. The method of any of claims 1, 2 or 3 wherein the audio and video information are concurrently transmitted by the same CATV system.

5. The method of any of claims 1, 2 or 3 wherein the frequency of the FM signal is converted to a frequency in the conventional FM broadcast band by overdriving a limiting amplifier and amplifying the second harmonic of the limiting amplifier output.

6. The method of claim 5 wherein the audio and video information are concurrently transmitted by the same CATV system.

7. The method of any of claims 1, 2 or 3 wherein frequency conversion is by hetrodyning.

8. The method of any of claims 1, 2 or 3 wherein additional audio information is transmitted in the audio modulated portion of conventional television channel.

9. Apparatus for the secure transmission of audio information in a system for transmission of associated television audio and video information comprising at least one audio signal source, a video transmitter for producing a first RF signal in the television broadcast band, the first RF signal being modulated by the output of the video signal source, at least one audio signal source, an audio transmitter for producing a second RF signal at a frequency outside of the conventional broadcast bands, the second RF signal being at a subharmonic of a frequency in the conventional FM broadcast band and the second RF signal being modulated by the output of the audio signal source, combiner means for combining the first RF signal and the second RF signal on a common transmission system, converter means at a receiving location on said common transmission system for converting the second RF signal to the frequency in the FM broadcast band, and a conventional FM broadcast band radio receiver.

10. The apparatus of claim 9, wherein the converter means comprises a frequency doubler.

11. The apparatus of claim 9, wherein the converter means comprises a limiting amplifier and a limiting amplifier output filter tuned to pass a harmonic of the audio modulated signal.

12. The apparatus of claim 11 further comprising a converter means input filter tuned to block passage of signals at the converter means output frequency.

13. The apparatus of claim 9 wherein the converter means comprises a local oscillator and a mixer connected to mix the signals from the local oscillator and the audio modulated signal.

* * * * *